United States Patent
Anderson et al.

(10) Patent No.: US 6,184,279 B1
(45) Date of Patent: Feb. 6, 2001

(54) COATING COMPOSITIONS AND COATED SUBSTRATES WITH GOOD APPEARANCE PROPERTIES

(75) Inventors: Lawrence G. Anderson, Pittsburgh; Karen S. Rechenberg, Gibsonia; Karen A. Barkac, Murrysville, all of PA (US)

(73) Assignee: PPG Industries Ohio, Inc., Cleveland, OH (US)

( * ) Notice: Under 35 U.S.C. 154(b), the term of this patent shall be extended for 0 days.

(21) Appl. No.: 09/089,023

(22) Filed: Jun. 2, 1998

(51) Int. Cl.$^7$ .............................. C08K 5/06; C09D 133/00
(52) U.S. Cl. ......................... 524/361; 522/42; 524/108; 524/110; 524/361; 524/362; 524/363; 524/364; 524/365; 525/438
(58) Field of Search ..................... 522/40; 524/108, 524/110, 361, 362, 363, 364, 365; 525/438

(56) References Cited

U.S. PATENT DOCUMENTS

| | | |
|---|---|---|
| 3,872,040 | 3/1975 | Mollohan et al. |
| 3,954,584 | 5/1976 | Miyata et al. .................. 204/159.23 |
| 4,367,245 | 1/1983 | Kishida et al. ...................... 427/54.1 |
| 4,695,601 | 9/1987 | Halpern ................................. 524/362 |
| 4,740,547 | 4/1988 | Halpern ................................. 524/359 |
| 4,740,548 | 4/1988 | Halpern ................................. 524/399 |
| 4,801,680 | 1/1989 | Geary et al. ......................... 528/272 |
| 5,342,893 | 8/1994 | Wilkinson et al. .................. 525/176 |
| 5,407,707 * | 4/1995 | Simeone et al. ..................... 427/410 |
| 5,663,240 | 9/1997 | Simeone et al. .................. 525/327.3 |
| 5,693,627 | 12/1997 | Schieven ............................... 514/137 |
| 5,695,851 | 12/1997 | Watanabe et al. .................... 428/147 |
| 5,700,891 | 12/1997 | Huver et al. .......................... 526/301 |
| 5,712,324 | 1/1998 | Lilly ........................................ 522/75 |
| 5,939,195 * | 8/1999 | Allen et al. ........................... 428/413 |

FOREIGN PATENT DOCUMENTS 0 471 409 A1   3/1992   (EP) .

* cited by examiner

Primary Examiner—Peter A. Szekely
(74) Attorney, Agent, or Firm—Deborah M. Altman; Paul S. Chirgott; Kenneth J. Stachel

(57) ABSTRACT

Coating compositions and coated substrates with the cured coatings of at least one curable film-forming resinous material along with an effective degassing amount of a material having the structure:

Structure I

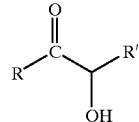

and dimer derivatives thereof wherein R and R' are the same or different and are primary alkyl groups with 1 to 6 carbon atoms including methyl or an aromatic group containing at least one heteroatom. Coating compositions like powder coating compositions have the resinous material and material of Structure I and/or dimer derivatives thereof along with one or more crosslinking agents. Optionally, the coating composition like a powder coating can have pigment(s), flow control agent(s), microcrystalline wax(es), light stabilizing agent(s), and/or antioxidant(s) and the like.

23 Claims, No Drawings

COATING COMPOSITIONS AND COATED SUBSTRATES WITH GOOD APPEARANCE PROPERTIES

FIELD OF THE INVENTION

The present invention relates to coating compositions with at least one curable film forming resin that result in cured coating films on substrates having good appearance from reduced defects like popping or gassing while allowing for a reduced tendency to discolor.

Various coating compositions involve curing of the film forming resins of the coating in a variety of ways ranging from self curing through evaporation of a carrier or solvent or reaction by such environmental factors like atmospheric water vapor to curing through the presence of one or more curing agents in the coating composition. The latter can be radiation curing like ultraviolet light curing and/or addition of crosslinking agents to crosslink with the film forming resin. With many of the aforementioned curing mechanisms or from application methods, the potential may exist for the latent evolution of gas, vapor or air during the curing of the coating. For instance with powder type coating compositions the spraying of the powder can result in entrapped air in the formed coating that could not adequately escape before curing. Such evolution can result in defects of the cured film from the gassing or popping or release of such gas, vapor and/or air.

For some powder coatings, several U.S. Pat. Nos. 4,801, 680; 5,461,089; 5,635,548 and 5,248,400 (Franks, et al.) have disclosed the use of benzoin as an additive or modifier. The art has indicated that in some powder coatings the benzoin performs a degassing or antipopping or air release function, when used in an amount from 0.5 to 3 weight percent. Several patent documents have noted a discoloration problem particularly in hydroxyalkylamide cured polyester powder systems when benzoin is used as a degassing agent. Discoveries were made that wax type and thermoplastic polymer type degassing agents in U.S. Pat. No. 5,342,893 (Wilkinson, et al.) and EP 0471409 (DSM) gave reduced discoloration when used in place of benzoin.

Solid particulate coating formulations referred to in the industry as "powder coatings" are finding increasing use in painting metal substrates both as primer coatings and as top or clear coats of the base coat and clear coat composite coatings. The automotive industry provides corrosion protection and decorative appearance for motor vehicles by multilayered coating or paint composites on the various types of surfaces of motor vehicles. The finishing layers of this composite usually include the popular base coat clear coat composites. The base coat is a pigmented layer and the clear coat is a nonpigmented or only slightly pigmented layer that is applied separately to the base coat and cured to some degree with the base coat. To provide improved coating composites for motor vehicles, the industry continuously seeks improvements from an environmental standpoint without sacrificing surface appearance and/or performance properties. Using powder coating compositions as clear coats as well as for other coating layers in multilayered composite coatings would provide an environmentally acceptable coating composition. The powder clear coats are becoming more widely used for their advantages in application from their lower organic solvent emissions. These coatings typically have very low levels of volatile solvents, i.e., on the order of two percent or slightly higher but generally much less than other paint systems. Such compositions serving as solutions of environmental acceptable technology can not increase problems such as surface appearance defects like popping, gassing and the like and increased likelihood of non-compensatible discoloration of the coating.

An object of the present invention is to provide liquid and/or powder coating compositions with one or more curable resins or polymers that result in cured coatings having reduced appearance or surface defects from air, gas or solvent release from the coating while curing and particularly while also resulting in a cured coating with reduced yellowing.

SUMMARY OF THE INVENTION

In accordance with the present invention, coating compositions have at least one liquid or particulate curable film forming resinous material, and an effective degassing amount of a material having the structure:

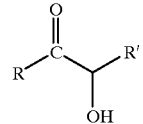

Structure I wherein R and R' are the same or different groups of primary alkyl groups with 1 to 6 carbon atoms including methyl groups or an aromatic group containing one or more heteroatoms either internal or external to the aromatic ring and dimer derivatives of Structure I compounds. The effective amount for degassing is usually in the range from about 0.01 to about 5 percent by weight based on the weight of total resin solids of the coating composition.

When the curable coating composition with the curable film-forming resinous material and the material of Structure I and/or dimers thereof is a liquid, a carrier may be used. The carrier can make the coating composition a solvent-borne or water-borne coating composition. Also, other additional components usually found in curable coating compositions can be present in amounts usually used by those skilled in the art. For chemical curing through crosslinking of a crosslinking agent with the curable film forming resinous material an appropriate crosslinking agent is present in the coating composition for crosslinking reaction with the resinous material. These amounts of the other additional components and film-forming resinous material provide most of the solids for the coating composition producing a cured coating. Also the liquid or powder coating composition of the present invention can be used as a single coating layer in coating substrates such as appliances and the like or as a coating layer in a multiple coating composite. Examples of the latter include those coating composites used in motor vehicle manufacturing and refinish coating operations which can include: liquid or powder primer coatings, primer surfacer coatings, pigmented or unpigmented formulations as well as pigmented formulations as the basecoat or in unpigmented formulations as the clearcoat in basecoat or colorcoat and clearcoat composite coatings.

DETAILED DESCRIPTION OF THE INVENTION

In the following description of the specification and claims unless otherwise expressly indicated to the contrary the following terms have the indicated meanings.

The use of numerical values in ranges for temperature, pressure, pH, and amounts of and molecular weight values of materials, whether number average molecular weight ("Mn") or weight average molecular weight ("Mw"), amounts expressed in equivalents and equivalent ratios, and other reaction and operational conditions are stated as approximations as though the minimum and maximum values within the stated ranges were both preceded by the word "about". In this manner small variations above and below, the stated ranges can be used to achieve substantially the same results as values within the ranges. Also, the disclosure of these ranges is intended as a continuous range including every value between the minimum and maximum values.

Also for molecular weights whether Mn or Mw, these quantities are those determinable from gel permeation chromatography using polystyrene as standards as is well known to those skilled in the art. An example is that discussed in U.S. Pat. No. 4,739,019 at column 4, lines 2–45. For this reference to a U.S. patent and for other references to issued U.S. patents and published patent applications in the following disclosure for the specifically stated information therein, that information is considered as incorporated by reference herein.

By the term "film-forming", it is meant that an at least near continuous film, except perhaps for a few if any pin hole type marks, can be formed on at least a horizontal surface from either 1) the particulate polymeric material of a powder coating upon at least melting and curing at elevated temperature, or 2) the polymeric material dispersed or solubilized in a solvent or carrier upon drying or evaporation of the solvent or carrier and/or curing of the polymeric material.

Also by the term "powder", it is meant a particulate, finely divided solid polymeric material generally having a particle size of 0.005 to 100 microns.

The term "epoxy content" refers to a determination through the epoxide equivalent weight in non-aqueous resins and their solutions by differential titration with perchloric acid using crystal violet as an indicator. An epoxy-containing sample is dissolved in glacial acetic acid and titrated against a standard solution of (0.1N) perchloric acid in glacial acetic acid in the presence of tetraethylammonium bromide, using crystal violet as indicator. This potentiometric titration with perchloric acid determines the base content of the polyepoxide. The mass in grams of sample containing one mole of unreacted epoxide functionality is determined by reaction of the epoxide with hydrobromic acid. The hydrobromic acid is generated in situ by the reaction of tetraethylammonium bromide with perchloric acid. A second sample of the polyepoxide is mixed with excess tetraethylammonium bromide and titrated with 0.1N perchloric acid to a green endpoint that persists for at least 30 seconds, and total epoxide and amine equivalents are calculated from these titrations, and the epoxide equivalent weight is calculated as the difference. The epoxy content is the epoxy equivalent weight divided by the molecular weight of the polyepoxide sample.

The curable liquid or solid film-forming resinous material of the coating composition of the present invention may be any of the polymers known to those skilled in the art to be useful in curable coating compositions including solvent-borne, water-borne, and powder coatings. The water-borne coatings include those that are water-dilutable, where binders are either molecular dispersed solutions in water or water/solvent blends or binders in the form of dispersions or emulsions.

One suitable class of polymer for the film-forming resinous material includes those which are derived from one or more ethylenically unsaturated monomers. Particularly useful members of this class are the acrylic polymers which are well established for the production of coatings in the automobile industry, such as polymers or copolymers of one or more alkyl esters of acrylic acid or methacrylic acid, optionally together with other ethylenically unsaturated monomers. These polymers are thermosetting and crosslinking. Suitable acrylic or methacrylic esters for this type of polymer include: ethyl acrylate, propyl acrylate, n-butyl acrylate, isobutyl acrylate, tert-butyl acrylate, 2-ethylhexyl acrylate, lauryl acrylate, methyl methacrylate, ethyl methacrylate, propyl methacrylate, n-butyl methacrylate, isobutyl methacrylate, tert-butyl methacrylate, isobornyl methacrylate, isodecyl methacrylate, lauryl methacrylate, 2-ethylhexyl methacrylate, and so forth and mixtures thereof. Cyclic esters such as cyclohexyl acrylate and cyclohexyl methacrylate, benzyl acrylate and/or methacrylate, as well as hydroxyalkyl esters such as 2-hydroxyethyl acrylate or methacrylate, 2-hydroxypropyl acrylate or methacrylate, and hydroxybutyl acrylate and methacrylate may also be used. In addition, vinyl aliphatic or vinyl aromatic compounds other than alpha-methyl styrene dimer which is considered a chain transfer agent, such as acrylonitrile, methacrylonitrile, styrene, vinyl acetate, vinyl propionate and vinyl toluene can be used. The aforelisted acrylic ester monomers are hereinafter referred to as "Acrylic Ester Monomers". For crosslinking, suitable functional monomers to be used in addition to the aforementioned include acrylic acid, methacrylic acid, hydroxyethyl acrylate, hydroxyethyl methacrylate, 2-hydroxypropyl acrylate, 2-hydroxypropyl methacrylate, N-(alkoxymethyl)acrylamides and N-(alkoxymethyl)methacrylamides, where the alkoxy group may be, for example, a butoxy group, glycidyl acrylate, and/or glycidyl methacrylate.

Other suitable classes of polymers useful as the curable film-forming resinous material are: polyepoxides, acrylosilane polymers, acrylic polyol polymers, and, polyisocyanates.

In the curable coating composition of the present invention, the aforedescribed film-forming resinous materials are capable of film formation at least with crosslinking. Crosslinking can be through one or more designated film forming resinous materials with one or more crosslinking agent(s). For the film-forming resinous materials with crosslinking agents as the additional polymeric material or with two polymeric materials that are reactive with each other, the additional polymeric material and/or the inter-reactivity of both polymers result in crosslinking. For a polyepoxide film forming resinous material a polyacid material can be the crosslinking agent especially where as the preferred film forming resinous material the polyepoxide is the major film forming component of the coating. For the acrylosilane polymer film-forming resinous material, the acrylic polyol polymer can be the crosslinking agent. Although in this case, these polymeric materials have functionality so that one reacts to form crosslinks with the other along with any alkylated melamine-formaldehyde crosslinking agent. This occurs in a similar manner in the film-forming resinous material of polyisocyanate and a polymer having at least one group that is reactive with isocyanate.

For the aforementioned film-forming resinous materials any of the polymers and their crosslinkers can be any of those known to those skilled in the art. Non-exclusive examples include U.S. Pat. Nos. 4,650,718 (Simpson, et al.) (column 1, line 61 through column 3, line 40 and column 4, line 55 through column 9, line 15); U.S. Pat. No. 4,102,942 (column 3, lines 1–16); U.S. Pat. No. 4,798,745 (Martz, et al.) (column 2, line 66 through column 9, line 8); U.S. Pat. No. 4,699,814 (Ambrose, et al.) (column 4, line 10 through column 6, line 51); U.S. Pat. No. 3,567,692 (Haggis, et al.) (for all that it teaches about polymeric film forming materials); U.S. Pat. No. 4,681,811 (Simpson, et al.) (column 1, line 63 through column 10, line 65); and Canadian patent document No. 1,262,596 (for all that it teaches about polymeric film forming materials).

The acrylic polymers or copolymers can be used that are of one or more of the Acrylic Ester Monomers prepared via aqueous emulsion polymerization techniques and used directly in the preparation of aqueous coating compositions, or prepared via organic solution polymerization techniques with groups capable of salt formation such as acid or amine groups. Upon neutralization of these groups with a base or an acid, the polymers can be dispersed into aqueous medium. Generally, any method of producing such polymers that is known to those skilled in the art utilizing art-recognized amounts of monomers can be used.

Suitable functional monomers may be used in addition to the other acrylic monomers mentioned above for crosslinking purposes and include, for example, acrylic acid, methacrylic acid, hydroxyalkyl acrylates, and hydroxyalkyl methacrylates. Also, the acrylic polymer can be prepared with N-(alkoxymethyl)acrylamides and N-(alkoxymethyl) methacrylamides.

Besides acrylic polymers, the polymeric film-forming resin for the water borne coating composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane, 1,4-cyclo-hexanedimethanol and pentaerythritol. Suitable polycarboxylic acids are known to those skilled in the art and include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Where it is desired to produce air-drying alkyd resins, suitable drying oil fatty acids may be used and include those derived from linseed oil, soya bean oil, tall oil, dehydrated castor oil, or tung oil and the like.

The polyesters and the alkyd resins can contain a portion of free hydroxyl and/or carboxyl groups which are available for further crosslinking reactions.

Also polyurethanes can be used as the film-forming resinous material in the coating composition. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are more suitable, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

The polyester and polyurethane may be prepared with unreacted carboxylic acid groups, which upon neutralization with bases such as amines, allows for dispersion into aqueous medium for use in a water-borne coating composition. Examples of suitable basecoat compositions include the water-borne compositions disclosed in U.S. Pat. No. 4,403,003, (column 2, line 3 through column 13 line 12).

A suitable liquid film-forming resinous material is an epoxy-acid material when the coating composition is a clearcoat composition of a basecoat/clearcoat composite coating. The multi-package and single-package liquid compositions disclosed in U.S. Pat. No. 5,256,452 at columns 1–25 and U.S. Pat. No. 4,650,718 at columns 1–16, are suitable compositions.

The coating composition can have in addition to the film-forming resinous material one or more crosslinking agents. Of course, the crosslinking agents are somewhat specific depending on the film forming resinous material that is present in the composition since the two materials interact in crosslinking. In addition to the above-named crosslinking agents for specific types of resinous materials, i.e. polyacid crosslinking agent for a polyepoxide, acrylic polyol polymer or acrylosilane polymer for the other, and polymer having at least one group that is reactive with isocyanate for polyisocyanate, other crosslinking agents may be used. For the resinous materials with which they can crosslink, these include: diisocyanate, diepoxide or, a nitrogen resin, like a condensate of formaldehyde with a nitrogenous compound such as urea, thiourea, melamine or benzoguanamine, or a lower alkyl ether of such a condensate in which the alkyl group contains from 1 to 4 carbon atoms, typically referred to as an aminoplast. Such crosslinking agents are melamine-formaldehyde condensates in which a substantial proportion of the methylol groups have been etherified by reaction with butanol or alcohols like ethanol or methanol. Any of these crosslinking agents known to those skilled in the art for use with curable acrylic polymers may be used.

For the liquid film-forming resinous materials, the curable coating composition also has water or a solvent as a carrier in art-recognized amounts to function as a carrier. The water and/or other solvents used as carriers in the amounts of the aforelisted and incorporated patents are suitable for the coating composition of the present invention. Also the liquid film-forming resinous materials can have additional components which can be those disclosed in the aforelisted and incorporated patents in the amounts shown therein to comprise the film-forming resinous material.

The particulate film-forming resinous materials of the coating composition of the present invention may be any of the polymers known to those skilled in the art to be useful in curable, including thermosettable, powder coating compositions. The solid particulate resinous material for a powder coating can be an epoxy resin which can have a suitable crosslinking agent for the epoxy resin, for example, a carboxylic acid, a carboxylic functional acrylic resin, dicyandiamide, a polyanhydride or a carboxylic functional polyester resin; and a suitable crosslinking agent for the acrylic resin, for example, triglycidyl isocyanurate or hydroxyalkylamide or a carboxylic functional polyester resin and a suitable crosslinking agent for the polyester resin, for example, a blocked isocyanate crosslinking agent or a hydroxyalkylamide. The particulate film-forming resinous material may also be a thermoplastic particulate mixture of, for example, polyethylene, polypropylene, polyamide or polyester.

Suitable carboxylic acid group-containing polyesters for powder coating compositions which may be used are those based on a condensation reaction of aliphatic polyols, including cycloaliphatic polyols, with aliphatic and/or aromatic polycarboxylic acids and anhydrides. Examples of suitable aliphatic polyols include 1,2-ethanediol, 1,3-propanediol, 1,4-butanediol, 1,6-hexanediol, neopentyl glycol, cyclohexane dimethanol, trimethylolpropane, and the like. Suitable polycarboxylic acids and anhydrides include succinic acid, adipic acid, azelaic acid, sebacic acid, terephthalic acid, isophthalic acid, tetrahydrophthalic acid, hexahydrophthalic acid, trimellitic acid, and anhydrides of such acids. Other carboxylic acid group-containing polyesters, aliphatic polyols, and aliphatic and/or aromatic polycarboxylic acids and anhydrides as noted in U.S. Pat. Nos. 4,801,680 and 4,988,767 can be used. This is particularly the case for polyesters to have a glass transition temperature ("Tg") of from about 30° C. to about 85° C., more suitably from about 40° C. to about 75° C. Suitable crosslinking agents for these types of polyesters are the hydroxyalkyamides disclosed in this U.S. patent. The curable resinous materials of U.S. Pat. No. 4,988,767 are preferred for the preparation of powder primer surfacers.

When the powder coating composition is to give a transparent or clear topcoat layer used in a "color-plus-clear" composite coating as opposed to a powder primer composition, a particularly preferred powder coating composition is one with a mixture of a polyepoxide and a polyacid crosslinking agent. The polyepoxides generally have a (Tg) less than 50° C., more preferably less than 30° C. The Tg of the copolymer contributes to the stability of the powder coating composition. The higher the Tg of the copolymer, the better the stability of the coating. The Tg is described in PRINCIPLES OF POLYMER CHEMISTRY (1953), Cornell University Press. The Tg can actually be measured or it can be calculated as described by Fox in *Bull. Amer. Physics Soc.*, 1, 3 page 123 (1956). The actual measured values for Tg are obtainable by differential scanning calorimetry (DSC) usually at a rate of heating of 18° F. (10° C.) per minute, where the Tg is taken at the first inflection point. Also, the Tg can be measured experimentally by using a penetrometer such as a DuPont 940 Thermomedian Analyzer. The Tg of the polymers as used herein for this invention refers to the calculated values unless otherwise indicated.

Curable particulate epoxy film-forming resinous material for use with polyacid crosslinking agents can be selected from those well known in the art of powder coating compositions. They can be, for example, an epoxy resin such as an epoxy group-containing acrylic polymer or a polyglycidyl ether of a polyhydric alcohol such as those described in Reissue U.S. Pat. Nos. 32,261 and 4,804,581. In the preferred embodiment of this invention for clear coat powder compositions, the polyepoxides may include epoxy-containing acrylic polymers, epoxy condensation polymers such as polyglycidyl ethers of alcohols and phenols, certain polyepoxide monomers and oligomers, and mixtures of the foregoing.

Suitable epoxy-containing acrylic polymers are copolymers of an ethylenically unsaturated monomer having at least one epoxy group and at least one polymerizable ethylenically unsaturated monomer which is free of epoxy groups.

Ethylenically unsaturated monomers containing epoxy groups suitable for use in the epoxy copolymer are those containing 1,2-epoxy groups as are known to those skilled in the art. Nonexclusive examples include glycidyl acrylate, glycidyl methacrylate, 3,4-epoxycyclohexylmethyl(meth) acrylate; 2-(3,4-epoxycyclohexyl)ethyl (meth)acrylate and allyl glycidyl ether. The epoxy group-containing ethylenically unsaturated monomer is preferably used in amounts of from 30 to 70 and more preferably 40 to 70 percent by weight of the total monomers used in preparing the epoxy-containing acrylic copolymer.

Ethylenically unsaturated monomers which do not contain epoxy groups can be any such monomers known to those skilled in the art that can react by free radical addition polymerization with epoxy-containing unsaturated monomers to form a copolymer with epoxy functionality. Nonexclusive examples of such ethylenically unsaturated monomers which do not contain epoxy groups are the Acrylic Ester Monomers and other copolymerizable ethylenically unsaturated monomers including: vinyl aromatic compounds, nitriles; vinyl and vinylidene halides; vinylidene fluoride and vinyl esters; vinyl propionate, and vinyl pivalate; and alkoxysilane monomers having free radical polymerizable functionality; methacrylate-functional silanes, all as metnioned above.

In the practice of the invention, the glycidyl functional monomer can be copolymerized with a monomer having a Tg greater than 200° F. (93° C.). A high Tg monomer can assist in preventing caking and instability problems associated with powder coatings. Suitable monomers include methylmethacrylate and styrene. The Tg of these high Tg monomers refers to the calculated value of the homopolymer made from the monomer calculated as described above by Fox. For example, the Tg of methylmethacrylate monomer and styrene monomer is 221° F. (105° C.). The Tg of the copolymer is typically between 77° F. and 158° F. (25° C. and 70° C.), and more preferably between 95° F. and 131° F. (35° C. and 55° C.).

The epoxy copolymer can be prepared generally by any method known to those skilled in the art, for instance, by traditional free radical initiated polymerization techniques using suitable catalysts which include organic peroxides and azo-type compounds and chain transfer agents such as alpha-methyl styrene dimer and tertiary dodecyl mercaptan. Preferably, the preparation is by solution polymerization techniques in the presence of suitable catalysts such as organic peroxides, such as di-t-amyl peroxide, t-butyl perbenzoate, t-amyl peracetate, t-butyl peracetate or ethyl-3,3-di(t-amylperoxy)butyrate or azo compounds, such as benzoyl peroxide, N,N'-azobis(isobutyronitrile) or alpha, alpha-dimethylazobis(isobutyronitrile). Other free radical polymerization methods and other catalysts or initiators known to those skilled in the art for preparing epoxy copolymers can also be used. The polymerization can be carried out in an organic solution in which the monomers are soluble as known to those skilled in the art. Suitable solvents are aromatic solvents such as xylene toluene and mixtures thereof, ketones such as methyl amyl ketone or ester solvents such as ethyl 3-ethoxypropionate. Also other materials may be present for or during the polymerization; for example, a chain transfer agent such as alpha-methyl styrene dimer is preferably present in conventional chain transfer amounts. Generally, such a polymerization process is disclosed along with additional examples of both ethylenically unsaturated monomers with and without epoxy functionality in U.S. Pat. Nos. 4,681,811 and 4,650,718 (column 1, line 61 through column 3, line 40 and column 4, line 55 through column 9, line 15).

The epoxy-functional copolymer usually has: (a) between 25 to 85, percent by weight, based on weight of the copolymer, of the glycidyl functional ethylenically unsaturated monomer; and (b) usually between 15 to 75 percent of a copolymerizable ethylenically unsaturated monomer or mixture of monomers free of glycidyl functionality. The percentages by weight are based on the total weight of (a) and (b) which can equal 100 percent. Preferably, the copolymer has: (a) 35 to 55 percent by weight of the glycidyl functional monomer; (b) 40 to 60 percent by weight of one or more copolymerizable ethylenically unsaturated monomers having a Tg greater than 200° F. (93° C.), such as styrene and methylmethacrylate; and (c) from around 5 to around 20 percent by weight, based on weight, of one or more additional copolymerizable monomers different from (a) and (b) like butylmethacrylate. The percentages by weight are based on the total weight of (a), (b), and (c) which again can equal 100 percent although other polymerizable monomers could also be included.

A suitable epoxy functional copolymer can contain from 3.5 to 5.9 moles of glycidyl functional ethylenically unsaturated monomer per kilogram of epoxy functional copolymer, more preferably between 3.0 and 5.1 moles of glycidyl functional monomer per kilogram of epoxy functional copolymer.

Epoxy condensation polymers such as polyglycidyl ethers of alcohols and phenols may be used such as those described in U.S. Pat. No. 4,650,718 column 5, lines 41 through 58.

In addition to the epoxy copolymers described above, certain polyepoxide monomers and oligomers can also be present. Examples of these materials are described in U.S. Pat. No. 4,102,942 in column 3, lines 1–16. Specific examples of low molecular weight polyepoxides are 3,4-epoxycyclohexylmethyl 3,4-epoxycyclohexanecarboxylate and bis(3,4-epoxycyclohexylmethyl)adipate. These low molecular weight polyepoxides may be used to increase the cure response and solids content of the curable compositions. When used, they are present in amounts up to 30, preferably 5 to 30 percent by weight based on the total weight of resin solids in the curable composition.

The epoxy functional copolymer can have a number average molecular weight typically of about 1000 to 20,000. The term "molecular weight" refers to a number average molecular weight as determined by gel permeation chromatography using a polystyrene standard. Therefore, it is not an absolute number average molecular weight which is measured, but a number average molecular weight which is a measure relative to a set of polystyrene standards. The preferred number average molecular weight for the epoxy functional copolymer is about 1000 to 5500.

Another possibility for the presence of the epoxy-containing copolymer is as a blend of more than one epoxy acrylic polymer where the blend can be the predominant film-forming polymer of the curable clear coating composition. The two epoxy acrylic polymers in the blend can have the Mn, Tg, and epoxy content as shown in Table A as "I" and "II" compared to a single epoxy acrylic polymer that can be used.

TABLE A

|  | Mn (grams) | Tg ° C. | Epoxy Content[2] |
|---|---|---|---|
| Single Epoxy Acrylic Polymer | about 1000 to about 5500 | about 30 to about 60° C. as measured or 50 to 85° C.[1] | 35 to 85 |
| Blend: Epoxy Acrylic Polymers I | I) about 1000 to about 10,000 | about 40 to about 85[1] | 40–60 |
| Epoxy Acrylic Polymers II | II) about 500 to about 3000 | about 35 to about 125[1] | 50–100 |

[1]As calculated by the Acrylic Glass Transition Temperature Analyzer from Rohm and Haas Company which is based on the Fox equation.
[2](GMA) As weight percent of the monomers to prepare the epoxy acrylic polymer.

In the blend, two epoxy acrylic polymers have relatively low molecular weights and one polymer has a higher epoxy content within the higher range shown in Table A. If the epoxy acrylic polymer II of Table A has the epoxy content of 50 weight percent, the epoxy acrylic polymer I has a lower epoxy content within the range of 40 to almost 50. Also, when the higher epoxy content epoxy acrylic polymer has an epoxy content from 50 to 60, the epoxy content of the lower epoxy content epoxy acrylic polymer is in the range from 40 up to almost the value of epoxy content for the higher epoxy content epoxy acrylic polymer. Of course, with the epoxy content of greater than 60 for the higher epoxy content epoxy acrylic polymer, the epoxy content for the lower epoxy content epoxy acrylic polymer is in the range of from about 40 to 60. Also, the higher epoxy content epoxy acrylic polymer usually has the lower molecular weight between the two polymers "I" and "II" in the blend. Generally, the ratio of the low epoxy content polymer to the higher epoxy content polymer is in the range of 90:10 to 10:90. Both of these epoxy acrylic polymers can be prepared in the aforedescribed process. A suitable blend is that wherein both of the first and second polymers of the blend are formed by polymerizing (x) glycidyl functional ethylenically unsaturated monomer, and (y) copolymerizable ethylenically unsaturated monomer or mixture of monomers free of glycidyl functionality and having a effective amount and type of other monomers (y) to yield the Tg for the copolymer. For this type of blend of copolymers the epoxy functionality is derived from at least 35 percent by weight of (x) and (y) of a glycidyl functional ethylenically unsaturated monomer, and wherein the percents by weight are based on the weight of (x) and (y); and where the blend has styrene in an amount up to 39 percent by weight for (x) and (y) for both the first and second epoxy functional acrylic copolymers. For this type of blend as well as others a suitable amount of the higher molecular weight copolymer is from 70 to 85 and the lower molecular weight copolymer is from 15 to 30 weight percent based on the weight of these two copolymers.

The polyacid crosslinking agent to crosslink with the film-forming resinous material is present in the composition in amounts of about 10 to 90, preferably 25 to 75 percent by weight based on total weight of resin solids in the coating composition. A suitable polyacid crosslinking agent has a high average acid functionality. More specifically, the polyacid crosslinking agent on average contains more than two acid groups per molecule, more preferably three or more, and most preferably four or more, such acid groups being reactive with the polyepoxide to form a crosslinked or cured coating as indicated by its resistance to organic solvent. The polyacid can have greater than two acid groups per molecule which is intended to encompass mixtures of polyacid crosslinking agents in which difunctional crosslinking agents are mixed with tri- or higher functionality polyacid crosslinking agents. Polyacid crosslinking agent mixtures including up to about 50 percent of a difunctional crosslinking agent with a trifunctional curing agent are suitable. Higher percentages of difunctional materials can be used if the remainder of the crosslinking agent mixture is higher than trifunctional or if the polyacid crosslinking agent mixture is used with a highly functional polyepoxide component. The acid functionality is preferably carboxylic acid, although acids such as phosphorus-based acid may be used. Preferably, the polyacid crosslinking agent is a carboxylic acid terminated material having, on average, greater than two carboxylic acid groups per molecule. Among the polyacid crosslinking agents which may be used are carboxylic acid group-containing polymers such as acrylic polymers, polyesters, and polyurethanes; oligomers such as ester group-containing oligomers, which are preferred; and monomers. Suitable art-recognized polyacid crosslinking agents include those described in U.S. Pat. No. 4,650,718; (column 1, line 61 through column 3, line 40 and column 4, line 55 through column 9, line 15); U.S. Pat. No. 4,681,811 (column 1, line 63 through column 10, line 65); and U.S. Pat. No. 4,703,101 (column 3, line 26 to column 6, line 5).

The equivalent ratio of the reactants present in the powder coating composition is adjusted such that for each equivalent of epoxy there are around 0.3 to around 3.0, preferably 0.75 to 1.5 equivalents of carboxyl (anhydride, if present, is considered monofunctional).

The powder coating composition is prepared by combining approximately 60 to 95 percent by weight of the epoxy functional copolymer with about 5 to 40 percent by weight, based on total weight of the powder coating composition, of a polycarboxylic acid crosslinking agent. When these amounts are based on weight percent of the two materials, copolymer and crosslinker, the amount can exceed the aforementioned values to equal 100 weight percent. The ratio of the epoxy functional copolymer to this crosslinking agent can be 1:0.5 to 1.5 and more suitably 1:0.6 to 1.4. Preferably, the polycarboxylic acid is a crystalline material, more preferably a crystalline aliphatic material containing from 4 to 20 carbon atoms. Examples of suitable acids include adipic, succinic, sebacic, azelaic and dodecanedioic acid. In addition, carboxylic acid functional polyesters may be used to crosslink the powder coating composition. Low molecular weight polyesters and half-acid esters can be used which are based on the condensation of aliphatic polyols with aliphatic and/or aromatic polycarboxylic acids or anhydrides, or the reaction of aliphatic polyols and aliphatic and/or aromatic anhydrides, respectively. Examples of suitable aliphatic polyols are those hydroxylalochols noted above for acrylic polymers. The polycarboxylic acids and anhydrides may include those mentioned above, as well as terephthalic acid, isophthalic acid, phthalic acid, phthalic anhydride, tetrahydrophthalic acid, tetrahydrophthalic anhydride, hexahydrophthalic acid, methyltetrahexahydrophthalic anhydride, alkylhexahydrophthalic anhydride, chlorendic anhydride and the like. Mixtures of the polycarboxylic acids, anhydrides and polyols may also be used.

Typically, the preferred range of epoxy functional copolymer to polycarboxylic acid crosslinking agent is between 70 to 85, more preferably 70 to 80 percent by weight epoxy functional copolymer and between 15 to 30, more preferably 20 to 30 percent by weight polycarboxylic acid crosslinking agent, based on total weight of the powder coating composition. The use of aliphatic crystalline dicarboxylic acids is preferred, and in particular, dodecanedioic acid is most preferred. The advantage of these crystalline crosslinkers, particularly at the higher levels, is that generally they are incompatible with the epoxy functional copolymer providing for a more stable powder coating composition. However, when the powder coating composition is melted, the polyacid crosslinking agent is compatible and soluble in the acrylic copolymer acting somewhat as a diluent allowing for improved flow and appearance.

Anti-popping or degassing or the reduction of the release of air from the coating composition as it is cured is accomplished in the aforedescribed curable coating composition by the presence of at least one material having the structure:

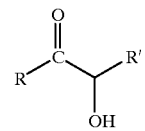

Structure I wherein R and R' are the same or different and may be a methyl group or a primary alkyl group with 1 to 6 carbon atoms or an aromatic group containing one or more heteroatoms either internal or external to the aromatic ring. The heteroatoms external to the ring may be attached directly to the ring or indirectly through one or more carbon atoms. One or more heteroatoms may be present in each such substituent and one or more substituents may be attached to the aromatic ring. The heteroatom containing substituent(s) may be attached to the aromatic ring in any position or combination of positions on the ring. Suitable heteroatoms substituents include but are not limited to amines, ethers, esters, ketones, amides, halides, sulfonamides, nitro and carboxylic acid groups. Heteroatoms internal to the aromatic ring may be present in any position or combination of positions. Suitable heteroaromatic groups include but are not limited to furans, pyridines, thiophenes, triazines, imidazoles, oxazoles, thiazoles, pyrazoles and triazoles. Materials of Structure I are known to form dimeric derivatives, particularly when R and R' are alkyl (Merck Index, 11ed, p10, 55). These dimers often have different physical properties, such as melting point ("mp"), density and the like. which may be preferred for a specific application.

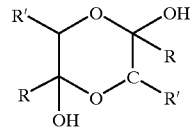

Structure II

Such a dimer derivative can have the structure of Structure II above where R and R' are as described above for Structure I. Generally, the amount of the material of Structure I or II is in the range of 0.01 to 5 weight percent of the resin solids of the coating composition. Preferably, R and R' are methyl and/or butyl and the amount of a material with Structure I is present in the coating composition at a lower amount of 0.1 while the upper limit of the preferred amount can be 3 weight percent. The preferred hetroatomic group is furyl, pyridyl, methoxy phenyl, and dimethylaminophenyl. The compound of Structure I which has the aromatic group containing one or more heteroatoms can be used as a degassing agent in coating compositions where the color is not critical or can be pigmented, masked, or covered. The compounds of Structure I that are useful for degassing and which have a reduced tendency to yellow and are ideal for unpigmented or only slightly pigmented coating compositions are where the R and R' groups are methyl and/or primary alkyl groups.

The particulate as well as the liquid coating composition with the curable film-forming resinous material may also contain additional materials as known to those skilled in the art. The powder coating composition may also contain additional materials as known to those skilled in the art. For example, an anhydride for improved cure response and copolymer of an alpha olefin and olefinically unsaturated anhydride for improved humidity resistance of the cured coating can be used.

Additionally, for particulate or powder coating compositions, polymer or copolymer flow control or flow modifying agents known to those skilled in the art can be used. Suitable examples and amounts are shown in U.S. Pat. No. 5,212,245 (columns 2–4). Also, commercially available flow control polymers and copolymers can be used such as Modaflow (or Resiflow) flow additives, available from Monsanto Chemical Company of St. Louis, Mo. and the like. Generally, the weight average molecular weight of the copolymer flow control agents can range from about 1000 to 40,000, preferably 1000 to 15,000. Generally, the Tg of the copolymer is less than 10° C. and preferably less than 0° C. and most preferably in the range of −60° C. to −10° C. The Tg can be calculated and measured in the aforedescribed manner. The Tg of the copolymer is not limiting of its performance as a flow additive but Tg's greater than 10° C. are not preferred because of decreased flow on coating application. A suitable amount of the flow control agent can be in the range of from about 0.01 to about 10 percent by weight based on total resin solids for the curable powder composition. With the preferred powder coating, the weight percent is of the total resins of the coating composition. Preferably, the flow control copolymer will be included in the powder coating composition in amounts of 0.1 to 3 percent by weight, more preferably from about 0.5 to about 2 percent by weight for clear coat applications. The preferred flow modifier is that shown in the examples.

The coating compositions of the invention can optionally include other materials such as pigments, fillers, catalysts like organic peroxides and azo-type compounds, chain transfer agents, light stabilizers, flow control or modifying agents, additional film forming polymers, and antioxidants such as those shown in U.S. Pat. No. 5,407,707. Nonexclusive examples of light stabilizers include those shown in the Examples herein, like (2-tert-butyl-2-(4-hydroxy-3,5-di-tert-butylbenzyl)[bis(methyl-2,2,6,6,-tetramethyl-4-piperidinyl)]dipropionate) and (2-(3',5'-bis(1-methyl-1-phenylethyl)-2'-hydroxyphenyl)benzotriazole) and others such as CGL 1545 hydroxyphenyl triazine ultraviolet absorber available from Ciba-Geigy Limited, Basel, Switzerland. Also useful are anti-yellowing agents like 9,10-dihydro-9-oxa-10-phosphaphenanthrene-10-oxide, or 3,4,5,6-dibenzo-1,2-oxaphosphane-2-oxide as a white crystalline powder with a specific gravity of 1.40 at 30° C., and a melting point of 118° C. and a boiling point of about 200° C. at 5 mm Hg., and fatty acid amide including ethylene bis-stearoylamide.

Although the powder coating composition is preferably a clear coat for a base coat and clear coat composite, one or more pigments can be included in the coating composition. Their amounts would range from 1 to 50 percent by weight based on total weight of the composition if color is desired for the resultant coating. Suitable pigments include, for example, inorganic pigments including: titanium dioxide, iron oxide, chromium oxide, lead chromate, and barium sulfate, and organic pigments including, ultramarine blue, phthalocyanine blue, phthalocyanine green, carbon black, graphite fibrils, and quindo red. When the powder coating is applied under a basecoat layer the pigment can be included in the coating composition in amounts of up to 16, preferably 1.0 to 10 percent by weight based on total weight of the coating composition in order to give a suitable color to the resultant coating. When the thermosetting powder coating is a layer in a multilayered coating composite beneath at least one layer such as a topcoat layer, such pigment additives may be excluded and pigments may instead be incorporated into a topcoat layer.

In addition, the powder coating composition may include fumed silica or the like to reduce caking of the powder during storage. An example of a fumed silica is sold by Cabot Corporation under the trademark CAB-O-SIL. The fumed silica is present in amounts ranging from 0.1 to 1 percent by weight based on total weight of the powder coating formulation.

The thermosetting powder coating compositions are prepared by melt blending the ingredients. This can be accomplished by first blending the ingredients in a high shear mixer such as a planetary mixture, and then melt blending in an extruder from 80° C. to 130° C. The extrudate is then cooled and pulverized into a particulate blend. Such a particulate mixture can be applied preferably by spraying techniques.

The powder coating composition and preferably the particulate thermosetting powder coating composition can be applied directly to a substrate of, for example, metal such as steel or aluminum. Most preferably, the powder coating is a clearcoat for application over or with any basecoat formulations known to those skilled in the art such as water-borne basecoats. The film-forming composition of the base coat in the color-plus-clear system can be any of the compositions useful in coatings applications, particularly automotive applications. The film-forming composition of the base coat comprises a film-forming resinous binder and a pigment to act as the colorant. Particularly useful resinous binders are acrylic polymers, polyesters, including alkyds, and polyurethanes.

The base coat compositions may be solventborne or waterborne. Waterborne base coats in color-plus-clear compositions are disclosed in U.S. Pat. No. 4,403,003; EP 0038127; EP 0206615; EP 0502934; EP 0260447; EP 0281936; EP 0228003; and EP 0355433 and the resinous compositions used in preparing these base coats can be used in the practice of this invention. Also waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat. Additional examples of such base coats include those solvent-borne and water-borne film-forming resinous materials that include one or more pigments such as those available from PPG Industries, Inc., Pittsburgh, Pa., U.S.A.

The base coat contains pigments to give it color. Compositions containing metallic flake pigmentation are useful for the production of so-called "glamour metallic" finishes chiefly upon the surface of automobile bodies. Suitable metallic pigments include in particular aluminum flake, copper bronze flake and metal oxide coated mica. Besides the metallic pigments, the base coating compositions of the present invention may contain non-metallic color pigments conventionally used in surface coatings including inorganic pigments and organic pigments as mentioned above for the powder coating in amounts of 1 to 80 percent by weight based on weight of coating solids. The metallic pigment is employed in amounts of about 0.5 to 25 percent by weight based on weight of coating solids.

If desired, the base coat composition may contain additional materials well known in the art of formulated surface coatings and may be applied by methods or techniques known in the art. The additional materials would include surfactants, flow control agents, thixotropic agents, fillers, anti-gassing agents, organic cosolvents, catalysts, and other customary auxiliaries. These materials can constitute up to 40 percent by weight of the total weight of the coating composition. The base coating compositions can be applied to various substrates to which they adhere including wood, metals, glass, and plastic. Such conventional means of application include brushing, dipping, flow coating, spraying and the like, but they are most often applied by spraying. The usual spray techniques and equipment for air spraying and electrostatic spraying and either manual or automatic methods can be used. During application of the base coat composition to the substrate, a film of the base coat is formed on the substrate. Typically, the base coat thickness will be about 0.01 to 5 mils (0.254 to 127 microns), preferably 0.1 to 2 mils (2.54 to 50.8 microns) and most preferably 5 to 30 microns in thickness.

After application of the base coat to the substrate, a film is formed on the surface of the substrate by driving solvent, i.e., organic solvent or water, out of the base coat film by heating or by an air drying period. Preferably, the heating will only be for a short period of time, sufficient to ensure that the clear coat can be applied to the base coat without the former dissolving the base coat composition, yet insufficient to fully cure the basecoat. Suitable drying conditions will depend on the particular base coat composition and on the ambient humidity with certain waterborne compositions, but in general a drying time of from about 1 to 15 minutes at a temperature of about 80–250° F. (20–121° C.) is adequate. At the same time, the base coat film is adequately wetted by the clear coat composition so that satisfactory intercoat adhesion is obtained. Also, more than one base coat and multiple clear coats may be applied to develop the optimum appearance. Usually between coats, the previously applied coat is flashed, that is, exposed to ambient conditions for about 1 to 20 minutes.

Application of the powder coating composition of the present invention can be by spraying, and in the case of a metal substrate, by electrostatic spraying which is preferred, or by the use of a fluidized bed. The powder coating can be applied in a single sweep or in several passes to provide a film having a thickness after cure of from 1 to 15, preferably 1 to 6 mils (25.4 to 381 usually 25.4 to 152 microns). After application of the coating composition such as the preferred powder coating, the powder coating substrate is baked at a temperature sufficient to cure the coating, typically at about 250° F. to about 400° F. (121° C. to 204° C.) for about 1 to 60 minutes, and preferably at about 275° F. to 350° F. (135° C. to 177° C.) for about 10 to 30 minutes While the powder coating composition can be applied directly upon bare metal, that is, upon untreated, unprimed steel or upon pretreated, i.e., phosphatized unprimed steel, in one embodiment of the invention the powder coating composition is applied to a metal substrate having a thin layer of electrodeposited primer coating. The electrodeposited primer coating upon the metal substrate can be, for example, a cathodic electrodeposition primer composition such as those available from PPG Industries, Inc. under the UNI-PRIME trademark. In one aspect of the present invention, it is contemplated that the powder coating composition can be applied directly upon at least a portion of an uncured electrodeposited primer coating, for example, the electrodeposited primer coating deposited over an automotive or truck body and thereafter both the electrodeposited primer coating and powder coating as a primer coating can be co-cured by heating at a temperature between 275° F. to 350° F. (135° C. to 177° C.) for about 10 to 30 minutes.

As another aspect of the present invention, the aforementioned powder coating composition with the epoxy acrylic polymer as a single predominant film-forming polymer or as the blend of epoxy acrylic polymers is the clear unpigmented, or only slightly pigmented without interfering pigments, clear coat in a multilayered coating composite on substrates like those mentioned above. The multilayered coating composite can have one or more primer coats which can be any primer coating known to those skilled in the art and a basecoat for a basecoat plus clearcoat composite. For instance, the primer coat can be an electrodeposited primer coat of a cationic epoxy amine adduct cured with a polyisocyanate crosslinking agent alone or with solvent-borne primers. The basecoat can be any known to those skilled in the art like those noted above. In addition to the at least one epoxy acrylic polymer for the powder clear coat, other acrylic polymers and copolymers can be used as long as their Mn or weight average ("Mw") molecular weight is in a range similar to the aforementioned and hereinafter mentioned ranges for the epoxy acrylic polymer. This use is preferably as the predominant film-forming polymer as the aforedescribed epoxy acrylic polymer for the powder clear coat. These acrylic polymers and copolymers can have other functional groups with abstractable hydrogen such as hydroxyl, carboxyl, and amino and suitable noninterfering mixtures thereof.

EXAMPLES

The following examples show the preparation of coating compositions with curable film forming resinous materials as thermosetting powder coating compositions. Three of the compositions are comparative examples and eight are coating compositions of the present invention. All of the amounts are in parts by weight based on a total of 1000 grams of the powder coating formulation.

Powder Coating Compositions

Each epoxy-acid powder clear coat composition in Comparative Examples A through C and Examples 1–8 shown below in Table 1 are shown in amounts of parts by weight, and each composition was processed in the following manner. The components were blended in a Henschel Blender for 30 to 60 seconds. The mixtures were then extruded through a Werner & Pfleiderer co-rotating twin screw extruder at a 450 RPM screw speed and an extrudate temperature of 113° C. to 115° C. The extruded material was then ground and classified to a particle size of 17 to 27 microns using an ACM1 Grinder (Air Classifying Mill from Micron Powder Systems, Summit, N.J.). The finished powders were electrostatically sprayed onto test panels and evaluated for coatings properties.

Examples A and B are comparative powder coating compositions containing benzoin at different concentrations as the air release agent. Comparative example C is the same formulation of Comparative examples A and B without any benzoin and with adjusted amounts of the film forming resinous material and crosslinker for the absence of the benzoin. Examples 1 and 2 show powder coating compositions of the present invention containing different concentrations of the acetoin. Examples 3–8 are coating compositions of the present invention which were prepared in a similar manner to those of Examples 1 and 2 with other degassing materials.

Color Eye Instrument with illuminants C, A, and F at a 10° observer and using the CIELAB Space Equation. The dB (yellow/blue), the dE (total color shift), and the yellowness index (YI) can be used to report yellowing. The dB and dE values are the difference in color between the powder clear at 2.5 mils (63.5 microns) and a color standard which is comprised of the same primer and basecoat conditions with a two component clear coat applied at a film thickness of 1.8 mils (45.7 microns). The Yellowing Value reported in Table 2 is a combination of the dB, dE, and/or yellowness index values. The color measurements are reported as the change along the yellow/blue color axis versus a commercial two coat isocyanate clear coating. Also measured was pop resistance (Gassing DFT) which is evaluated visually by examining the clearcoat wedge panels for pops and noting the film thickness at which the popping begins. This is done by

TABLE 1

| Ingredient | Comparative Example A | Comparative Example B | Comparative Example C | Example 1 | Example 2 | Example 3 | Example 4 | Example 5 | Example 6 | Example 7 | Example 8 |
|---|---|---|---|---|---|---|---|---|---|---|---|
| Glycidyl methacrylate Functional Acrylic[1] | 689.7 | 683.7 | 692 | 688.2 | 683.7 | 683.7 | 683.7 | 683.7 | 683.7 | 683.7 | 683.7 |
| DDDA[2] | 227.6 | 225.6 | 228.3 | 227.1 | 225.6 | 225.6 | 225.6 | 225.6 | 225.6 | 225.6 | 225.6 |
| Acrylic Flow Add[3] | 11.0 | 11.0 | 11.0 | 11.0 | 11.0 | 11.0 | 11.0 | 11.0 | 11.0 | 11.0 | 11.0 |
| Benzoin | 2.0 | 10.0 | 0.0 | 0.0 | 0.0 | 0.0 | 0.0 | 0.0 | 0.0 | 0.0 | 0.0 |
| Microwax C[4] | 6.0 | 6.0 | 6.0 | 6.0 | 6.0 | 6.0 | 6.0 | 6.0 | 6.0 | 6.0 | 6.0 |
| Tinuvin 144[5] | 20.0 | 20.0 | 20.0 | 20.0 | 20.0 | 20.0 | 20.0 | 20.0 | 20.0 | 20.0 | 20.0 |
| CGL-1545[6] | 20.0 | 20.0 | 20.0 | 20.0 | 20.0 | 20.0 | 20.0 | 20.0 | 20.0 | 20.0 | 20.0 |
| GCA-1[7] | 20.0 | 20.0 | 20.0 | 20.0 | 20.0 | 20.0 | 20.0 | 20.0 | 20.0 | 20.0 | 20.0 |
| ARMEEN M2C[8] | 3.7 | 3.7 | 3.7 | 3.7 | 3.7 | 3.7 | 3.7 | 3.7 | 3.7 | 3.7 | 3.7 |
| Acetoin (liquid) | 0.0 | 0.0 | 0.0 | 4.0 | 10.0 | 0.0 | 0.0 | 0.0 | 0.0 | 0.0 | 0.0 |
| Acetoin (solid) | 0.0 | 0.0 | 0.0 | 4.0 | 0.0 | 10.0 | 0.0 | 0.0 | 0.0 | 0.0 | 0.0 |
| Butyroin | 0.0 | 0.0 | 0.0 | 0.0 | 0.0 | 0.0 | 10.0 | 0.0 | 0.0 | 0.0 | 0.0 |
| Furoin | 0.0 | 0.0 | 0.0 | 0.0 | 0.0 | 0.0 | 0.0 | 10.0 | 0.0 | 0.0 | 0.0 |
| Pyridoin | 0.0 | 0.0 | 0.0 | 0.0 | 0.0 | 0.0 | 0.0 | 0.0 | 10.0 | 0.0 | 0.0 |
| Anisoin | 0.0 | 0.0 | 0.0 | 0.0 | 0.0 | 0.0 | 0.0 | 0.0 | 0.0 | 10.0 | 0.0 |
| 4-dimethyl amino benzoin | 0.0 | 0.0 | 0.0 | 0.0 | 0.0 | 0.0 | 0.0 | 0.0 | 0.0 | 0.0 | 10.0 |

[1]Acrylic as described in PCT Patent Publication WO 97/29854 and PCT Patent Application Ser. No. US97/16800. The single epoxy acrylic polymer, which is the predominant film-forming polymer, has a number average molecular weight ("Mn") range, a range of glass transition temperature (Tg), and a range of epoxy content all as shown in Table A above for the single epoxy copolymer.
[2]Dodecanedioic Acid
[3]Acrylic flow agent prepared by solution polymerization in xylene of the following monomers: 2% N,N-dimethylaminoethyl methacrylate, 16.8% hydroxyethyl acrylate, and 81.2% 2-ethylhexyl acrylate. The polymerization was at reflux temperature in the presence of t-amyl peracetate (commercially available as LUPERSOL 555M60 from Elf Atochem, Inc.) and t-butyl peracetate. The acrylic flow agent was vacuum stripped (1.0 mm of Hg) at 100° C. to 100% solids.
[4]Wax C Micro Powder, a fatty acid amide (ethylene bis-stearoylamide), commercially available from Hoechst-Celanese Corporation (New Jersey).
[5]Tinuvin 144 (2-tert-butyl-2-(4-hydroxy-3,5-di-tert-butylbenzyl)[bis(methyl-2,2,6,6-tetramethyl-4-piperidinyl)]dipropionate), an ultraviolet light stabilizer available from Ciba-Geigy Corp.
[6]CGL-1545 (2-[4((2-Hydroxy-3-(2-ethylhexyloxy)propyl)-oxy]-2-hydroxyphenyl)-4,6-bis(2,4-dimethylphenyl)-1,3,5-triazine), an ultraviolet light stabilizer available from Ciba-Geigy Corp.
[7]Oxaphosphone oxide, an anti-yellowing agent commercially available from Sanko Chemical Corp.
[8]Methyl dicocoamine available from Akzo-Nobel Corp.

The powder coating compositions of Comparative Examples A through Example 8 were prepared for testing in the following manner. Test panels, coated with electrocoat primer commercially available from PPG Industries, Inc. as ED-5000, were primered and basecoated, by spray application to a film thickness of about 1.1 mils (27.9 microns) and 1.0 mils (25.4 microns) respectively, with a white solvent-borne primer commercially available from Mehnert & Veek, Germany and a white waterborne basecoat, commercially available from BASF, Germany. The basecoated panels were flash baked for 10 minutes at 176° F. (80° C.) before electrostatically applying each powder clear coat composition. The powder coated panels were then cured for 30 minutes at 293° F. (145° C.). A powder clear wedge was applied with a dry film thickness (DFT) ranging from approximately 1 mil (25.4 microns) at the top of the panel to 6 mils (152.4 microns) at the bottom of the panel. The test panels were then tested for yellowing using a MacBeth visually viewing the wedge panel and determining the lowest film build without significant gassing for the panels coated with increasing film thickness along the distance from the top of the panel which had the lowest film build. No gassing defects on the panel from 5 to 8 mils (127 to 203 microns) was considered as good degassing and no gassing defects from 8 to 9 mils (203 to 230 microns) was considered excellent degassing. Table 2 describes further examples of this invention.

TABLE 2

| Example | Degassing Agent | Level (%) | Yellowing Value | Gassing DFT |
|---|---|---|---|---|
| Comparative A | Benzoin | 0.2 | medium | very good |

TABLE 2-continued

| Example | Degassing Agent | Level (%) | Yellowing Value | Gassing DFT |
|---|---|---|---|---|
| Comparative B | Benzoin | 1.0 | high | very good |
| Comparative C | None | 0.0 | low | low |
| 1C | Acetoin | 0.4 | low | good |
| 2D | Acetoin (liquid) | 1.0 | medium | very good |
| 3D | Acetoin (solid) | 1.0 | medium | very good |
| 4E | Butyroin | 1.0 | medium | very good |
| 5F | Furoin | 1.0 | very high | very good |
| 6G | Pyridoin | 1.0 | very high | very good |
| 7H | Anisoin | 1.0 | very high | very good |
| 8J | 4-dimethyl amino benzoin | 1.0 | very high | very good |

As seen from Table 2 the coating compositions of the present invention in Examples 2–8 all had very good degassing properties like that of the coating composition of comparative examples A and B with benzoin. The coating composition of Example 1 gave good degassing properties at a lower amount of the acetoin. Additionally, the coating composition of Example 1 gave the benefit of only low yellow color development with a lower amount of acetoin present in the composition. Also Examples 2–4 with a higher amount acyloin compound of Structure I or Structure II with the methyl or primary alkyl groups gave only a medium level of yellow color development and gave very good degassing properties. This shows that the presence of the acyloin material of Structure I or II at lower or higher amounts in the composition allows for good to very good degassing properties as achieved with the benzoin but with less yellow color development.

Therefore, what is claimed is:

1. A coating composition, comprising: curable film forming resinous material and an effective de-gassing amount of a material having the structure:

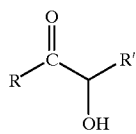

Structure I and dimer derivatives thereof wherein R and R' are the same or different and are primary alkyl groups with 1 to 6 carbon atoms including methyl.

2. Coating composition of claim 1 wherein dimer derivative has the structure:

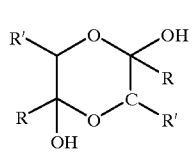

Structure II

3. Coating composition of claim 1 wherein R and R' are selected from the group consisting of methyl and butyl groups and combinations or mixtures thereof.

4. Coating composition of claim 1 wherein the effective amount is in the range of about 0.01 to about 5 weight percent of the resin solids of the composition.

5. Coating composition of claim 1 wherein the amount of the material of Structure I or dimer derivatives thereof is in the range of about 0.1 to about 3 weight percent of the resin solids of the curable composition.

6. Coating composition of claim 1 which includes a crosslinking agent to assist in curing the curable film forming resinous material.

7. The coating composition of claim 6 which includes at least one component selected from the group consisting of: catalyst, flow modifying agent, hindered amine light stabilizing agent, antioxidant, and second film-forming polymer.

8. Coating composition of claim 1 wherein the curable film-forming resinous material is selected from the group consisting of liquid and particulate curable film-forming resinous materials.

9. Coating composition of claim 1 which includes a carrier selected from the group consisting of: water and organic solvents.

10. Coating composition of claim 9 which is a thermoset powder coating having the curable film-forming resinous material in the absence of a carrier for the film-forming resinous material.

11. The coating composition of claim 1 in which the curable film-forming resinous material is based on a polyepoxide and which includes polyacid crosslinking agent for assisting in the cure of the curable polyepoxide resinous material.

12. A thermosetting powder coating composition comprising:
(i) from 60 to 95 percent by weight based on solids of the coating composition of at least one curable film-forming resinous material,
(ii) from 0.01 to 5 percent by weight based on total resin solids of the coating composition of a material having the structure:

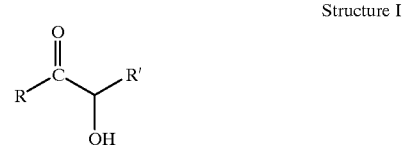

Structure I and dimer derivatives thereof wherein R and R' are the same or different and are primary alkyl groups with 1 to 6 carbon atoms including methyl and
(iii) 5 to 40 percent by weight based on the weight of (i) and (iii) of a crosslinking agent, where the ratio of (i) to (iii) is about 1:0.5 to 1.5.

13. Thermosetting powder coating composition of claim 12 wherein the powder coating composition is a powder clear coating composition and the at least one curable film-forming resinous material is at least one epoxy functional acrylic copolymer wherein the copolymer and the crosslinking agent (iii) is a polycarboxylic acid crosslinking agent, where the ratio of epoxy functionality for (i) to acid functionality for (iii) is about 1:0.6 to 1.4.

14. Thermosetting powder coating composition of claim 13 wherein the at least one epoxy functional acrylic copolymer is selected from the group consisting of:
(I) a single epoxy functional acrylic polymer having:
A) a number average molecular weight in the range of about 1000 to 5500;
B) a calculated Tg in the range of 50° C. to 85° C.;
C) a styrene content resulting from an amount of styrene monomer in the range of up to about 25 weight percent based on the weight percent of the monomers to form the copolymer;

D) epoxy content from 35 to 85 from glycidyl functional ethylenically unsaturated monomers and which is formed by polymerizing (1) 25 to 85 percent by weight of a glycidyl functional ethylenically unsaturated monomer, and (ii) 15 to 75 percent of a copolymerizable ethylenically unsaturated monomer or mixture of monomers free of glycidyl functionality for an effective amount of (2) monomers including a high Tg component monomer to yield the Tg for the copolymer, where all percents by weight are based on the weight of (1) and (2), and (II) a blend of at least two epoxy functional acrylic copolymers wherein one of the epoxy functional acrylic copolymers is selected from the group consisting of:
(α) the copolymer (I) above, and
(β) an epoxy functional acrylic copolymer having:
A) a number average molecular weight in the range of about 1000 to about 10,000, and
B) a calculated Tg in the range of about 40° C. to 85° C. and
C) an epoxy content from 40 to 60 weight percent of the total weight of the monomers to prepare the epoxy acrylic copolymer wherein this epoxy content is a lower epoxy content to that of the other epoxy acrylic copolymer in the blend; and wherein a second epoxy functional acrylic copolymer has:
A) a number average molecular weight in the range of about 500 to about 3000,
B) a calculated Tg in the range of about 35° C. to about 125° C., and
C) an epoxy content from glycidyl functional ethylenically unsaturated monomer that is higher than that of the first epoxy functional acrylic copolymer of the blend and in the range of about 50 to about 100;

wherein both of the first and second polymers of the blend (2) are formed by polymerizing (i) glycidyl functional ethylenically unsaturated monomer, and (ii) copolymerizable ethylenically unsaturated monomer or mixture of monomers free of glycidyl functionality and having a effective amount and type of other monomers (ii) to yield the Tg for the copolymer, so that for the blend of copolymers the epoxy functionality is derived from at least 35 percent by weight of (i) and (ii) of a glycidyl functional ethylenically unsaturated monomer, and wherein the percents by weight are based on the weight of (i) and (ii); and where the blend has styrene in an amount up to 39 percent by weight for (i) and (ii) for both the first and second epoxy functional acrylic copolymers.

15. The composition of claim 14 which includes a catalyst.

16. The composition of claim 14 wherein the catalyst is selected from the group consisting of organic peroxides and azo compounds and wherein chain transfer agents are present in the composition.

17. The composition of claim 14 which includes light stabilizers selected from the group consisting of (2-tert-butyl-2-(4-hydroxy-3,5-di-tert-butylbenzyl)[bis(methyl-2,2,6,6,-tetramethyl-4-piperidinyl)]dipropionate) and (2-(3',5'-bis(1-methyl-1-phenylethyl)-2'-hydroxyphenyl) benzotriazole).

18. The composition of claim 14 which includes anti-yellowing agent 9,10-dihydro-9-oxa-10-phosphaphenanthrene-10-oxide, or 3,4,5,6-dibenzo-1,2-oxaphosphane-2-oxide as a white crystalline powder with a specific gravity of 1.40 at 30° C., and a melting point of 118° C. and a boiling point of about 200° C. at 5 mm Hg.

19. The composition of claim 14 which includes at least one fatty acid amide including ethylene bis-stearoylamide.

20. The composition of claim 14 wherein the single epoxy acrylic copolymer has the glycidyl functional monomer copolymerized with one or more monomers having a Tg greater than 200° F. (93° C.).

21. The composition of claim 14 wherein the crystalline aliphatic polycarboxylic acid is dodecanedioic acid.

22. The composition of claim 14 wherein (I) is present in an amount of 70 to 85 percent by weight and (II) is present in an amount of 15 to 30 percent by weight based on the weight of (I) and (II).

23. The composition of claim 14 which includes an acrylic flow control polymeric additive selected from the group consisting of: flow control polymeric additive with a weight average molecular weight in the range from about 1000 to 40,000 and a Tg of less than 10° C., and amide modified polyester oligomer.

* * * * *